United States Patent
Nakanishi et al.

(10) Patent No.: US 7,164,179 B2
(45) Date of Patent: Jan. 16, 2007

(54) ANGULAR-VELOCITY SENSOR (75) Inventors: Tsutomu Nakanishi, Osaka (JP);
Hirofumi Tajika, Osaka (JP);
Michihiko Hayashi, Fukui (JP);
Satoshi Ouchi, Hyogo (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 114 days.

(21) Appl. No.: 10/495,926

(22) PCT Filed: Aug. 6, 2003

(86) PCT No.: PCT/JP03/09991

§ 371 (c)(1),
(2), (4) Date: Oct. 6, 2004

(87) PCT Pub. No.: WO2004/015370

PCT Pub. Date: Feb. 19, 2004

(65) Prior Publication Data

US 2005/0029606 A1 Feb. 10, 2005

(30) Foreign Application Priority Data

Aug. 7, 2002 (JP) ............................ 2002-229756

(51) Int. Cl.
*H01L 27/14* (2006.01)
(52) U.S. Cl. .................................................. 257/414
(58) Field of Classification Search ............... 310/330;
73/504.16; 257/414
See application file for complete search history.

(56) References Cited

U.S. PATENT DOCUMENTS

| 4,890,370 | A | | 1/1990 | Fukuda et al. |
| 5,430,344 | A | * | 7/1995 | Takeuchi et al. ............ 310/330 |
| 5,635,642 | A | * | 6/1997 | Nonomura et al. ...... 73/504.16 |
| 6,420,202 | B1 | | 7/2002 | Barber et al. |

FOREIGN PATENT DOCUMENTS

| JP | 9-159457 | 6/1997 |
| JP | 9-331087 | 12/1997 |
| JP | 2001-113710 | 4/2001 |

* cited by examiner

*Primary Examiner*—Carl Whitehead, Jr.
*Assistant Examiner*—Monica D. Harrison
(74) *Attorney, Agent, or Firm*—Wenderoth, Lind & Ponack, L.L.P.

(57) ABSTRACT

An angular velocity sensor includes a tuning-fork-shaped substrate (1), drivers (110) that are provided on the arms forming a tuning fork and vibrate the arms; monitors (150) for detecting vibrations generated by the drivers (110); and detectors (120) for detecting displacement of vibrations made in application of an angular velocity. The drivers (110), the monitors (150), and the detectors (120) are made of a lower electrode layer, a piezoelectric thin film, and an upper electrode layer formed on the arms. The outer peripheral edge of the piezoelectric thin film is shaped like a step having at least one flat portion. The flat portion along the outer peripheral edge has no upper electrode layer formed thereon. This structure prevents short circuits between the lower electrode layer and the upper electrode layer.

19 Claims, 5 Drawing Sheets

ANGULAR-VELOCITY SENSOR

TECHNICAL FIELD

The present invention relates to an angular velocity sensor using piezoelectric thin film.

BACKGROUND ART

Angular velocity sensors are often used in navigation systems or other applications, and downsizing thereof is requested. Therefore, in recent years, the structure of proposed sensors has been changing from one using bulk piezoelectric material, e.g. quartz crystal, to one using piezoelectric thin film, e.g. lead zirconate titanate (PZT). This is because piezoelectric thin film, such as PZT, has a piezoelectric constant extremely larger than that of bulk piezoelectric material, such as quartz crystal, and thus is downsized more easily.

Although the use of piezoelectric thin film can downsize an angular velocity sensor, there is a problem in production to be solved, which is never posed by bulk piezoelectric material. Because piezoelectric thin film is much thinner than bulk piezoelectric material, the electrodes sandwiching both surfaces of a piezoelectric thin film are prone to short-circuiting. Specifically, in the outer peripheral area of the piezoelectric thin film, the electrodes on both surfaces are prone to short-circuiting. It is necessary to ensure prevention of the short circuits in such an area.

The Japanese Patent Unexamined Publication No. H09-331087 discloses a structure in which a piezoelectric thin film is formed over a lower electrode layer in order to improve adherence in directly forming the piezoelectric thin film on a substrate. This example does not include the description about prevention of short circuits between the lower and upper electrode layers. However, this structure can prevent the short circuits.

The Japanese Patent Unexamined Publication No. 2001-113710 aims to realize a uniform shape to reduce variations in the displacement of a piezoelectric element. It discloses that appropriately setting the conditions for dry etching or wet etching allows the edges of a piezoelectric thin film to be etched into a taper shape.

DISCLOSURE OF THE INVENTION

In the first example, short circuits between the lower and upper electrode layers can be prevented. However, it is necessary to form the lower electrode layer into a specific shape before forming the piezoelectric thin film. For this reason, it is impossible to successively form the lower electrode layer and the piezoelectric thin film. Additionally, the piezoelectric thin film is formed on both surfaces of the lower electrode layer and substrate. Because the properties of these surfaces are different, the crystal orientation and characteristics of the piezoelectric thin film formed on the lower electrode layer and substrate are not the same. This poses a problem of causing larger variations in the characteristics of the piezoelectric thin film than those occurring when the piezoelectric thin film is formed only on the lower electrode layer.

The second example shows that etching into a taper shape can provide a uniform pattern shape. However, the publication does not mention that the taper shape can prevent the short circuits between the lower and upper electrode layers.

Therefore, the present invention aims to prevent the short circuits between the lower electrode layer and the upper electrode layer, which is a serious problem in realizing an angular velocity sensor using piezoelectric thin film.

To achieve this objective, an angular velocity sensor of the present invention includes the following components:
- a tuning-fork-shaped substrate including a pair of arms forming a tuning fork, and an integral area for integrally holding these arms;
- drivers provided on the arms for vibrating the arms;
- monitors for detecting vibrations generated by the drivers; and
- detectors for detecting displacement of the vibrations made in application of an angular velocity.

The drivers, monitors, and detectors are made of a lower electrode layer formed on the arms, a piezoelectric thin film formed on the lower electrode layer, and an upper electrode layer formed on the piezoelectric thin film. The outer peripheral edge of the piezoelectric thin film is shaped like a step having at least one flat portion. The flat portion along this outer peripheral edge has no upper electrode layer formed thereon.

This structure can prevent short circuits between the upper electrode layer and lower electrode layer and provide a highly reliable angular velocity sensor having stable characteristics even using a piezoelectric thin film having a large piezoelectric constant.

The angular velocity sensor of the present invention also can be structured as follows. The integral area includes a wiring part having lead wirings from the drivers, monitors, and detectors formed thereon, and a pad-forming part having electrode pads connected to the lead wirings formed thereon. At least in the pad-forming part, the entire lower electrode layer, i.e. a part of the lead wirings, is collectively connected to one electrode pad.

Because of this structure, in the pad-forming part in which electrode pads to be connected to external circuits by wire bonding, soldering, or the like, the lower electrode layer is not exposed. This prevents short circuits in the connection process, and thus realizes a highly reliable angular velocity sensor with high yields.

The angular velocity sensor of the present invention can also be structured so that the piezoelectric thin film between the lead wirings in the pad-forming part is thinner than the piezoelectric thin film in the drivers, monitors, and detectors. This structure ensures etching of the upper electrode layer when the lead wirings are formed by dry-etching the upper electrode layer. This can prevent the short circuits between the lead wirings and improve production yields.

The angular velocity sensor of the present invention can also be structured so that the substrate is made of single-crystal silicon. This structure facilitates formation of the shape of a tuning fork. Additionally, because the thin-film-forming surface is extremely smooth, a piezoelectric thin film having excellent crystal orientation can easily be obtained.

Further, the angular velocity sensor of the present invention is structured so that the piezoelectric thin film on the upper electrode layer side is thinner than the piezoelectric thin film on the lower electrode side with respect to the flat portion along the outer peripheral edge. With this structure, etching of the piezoelectric thin film with high reproducibility can be ensured by photolithography and dry etching processes. In other words, if deep etching is performed on the flat portion, the amount of etching after the first etching can be smaller. For this reason, the photo resist layer used for the second etching can be formed thinner than the photo resist layer used for the first etching. Because the second photo resist layer must be applied to the area of the piezoelectric thin film having a step, there is a possibility that a part of the second photo resist layer is thinner. However, because the etching time can be shortened, etching of the upper electrode layer or piezoelectric thin film that is exposed by disappearance of the photo resist layer can be prevented.

In the angular velocity sensor of the present invention, the lower electrode layer has a two-layer structure made of a titanium (Ti) layer formed on the substrate and a platinum-titanium (Pt—Ti) alloy layer formed on the titanium (Ti) layer. Having excellent adherence to a single-crystal silicon substrate or oxide substrate, the Ti layer can improve adherence of the lower electrode layer. Additionally, titanium (Ti) has properties unlikely to diffuse and deteriorate the platinum-titanium (Pt—Ti) layer and the piezoelectric thin film. Thus, a highly reliable angular velocity sensor can be realized.

Further, the angular velocity sensor of the present invention is structured so that the surface of the substrate having the drivers, monitors, detectors, and lead wirings and electrode pads therefrom has a holding area for holding the substrate to process the other side of the substrate.

This structure prevents the surface on which the piezoelectric thin film is formed in the drivers, monitors, and the like from being in direct contact with a base and thus prevents the piezoelectric thin film from being damaged when the bottom side of the substrate is subjected to photolithography or etching processes.

DETAILED DESCRIPTION OF PREFERRED EMBODIMENTS

Figure 1:
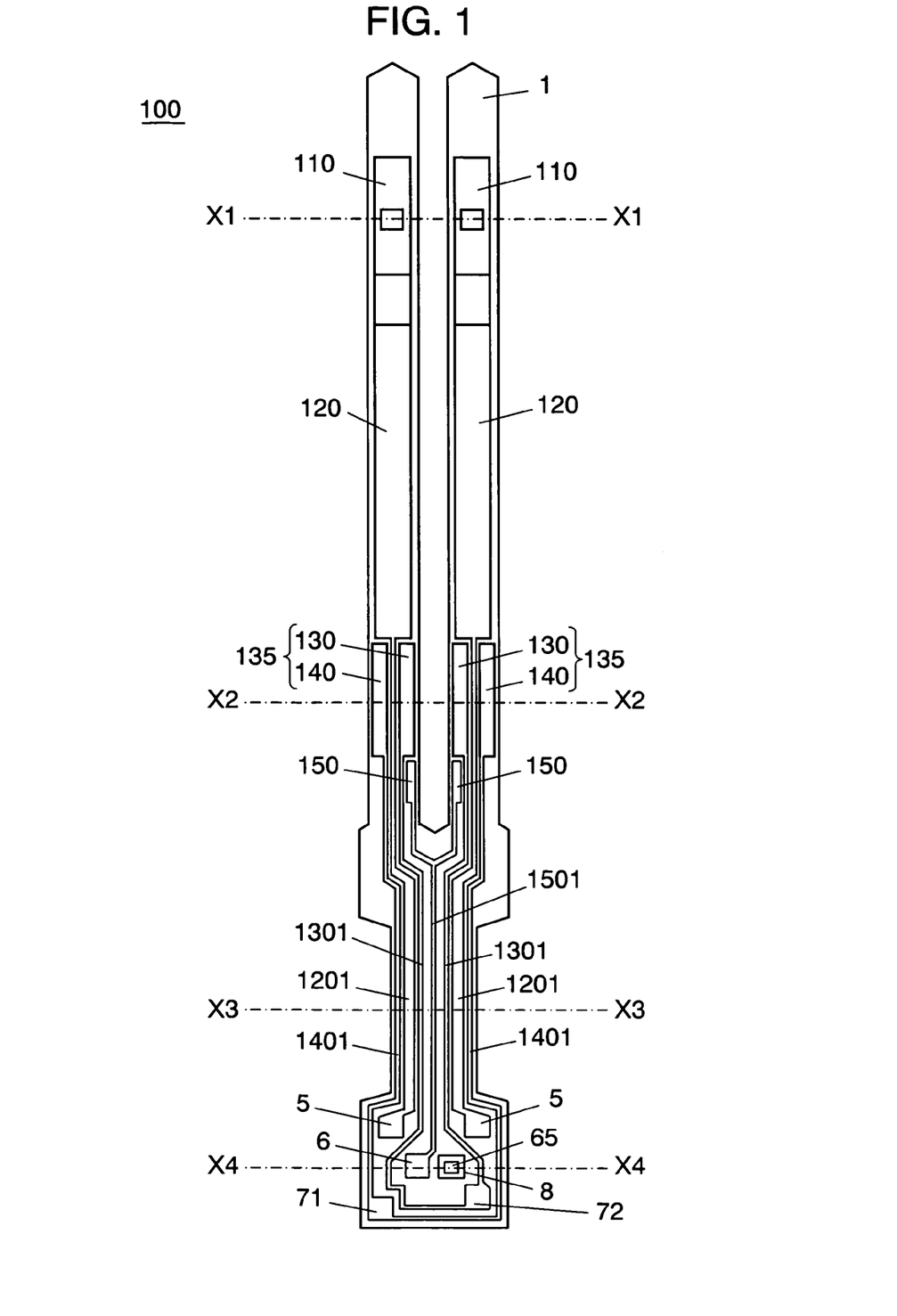
FIG. 1 is a plan view of an angular velocity sensor in accordance with an exemplary embodiment of the present invention.
Figure 2:
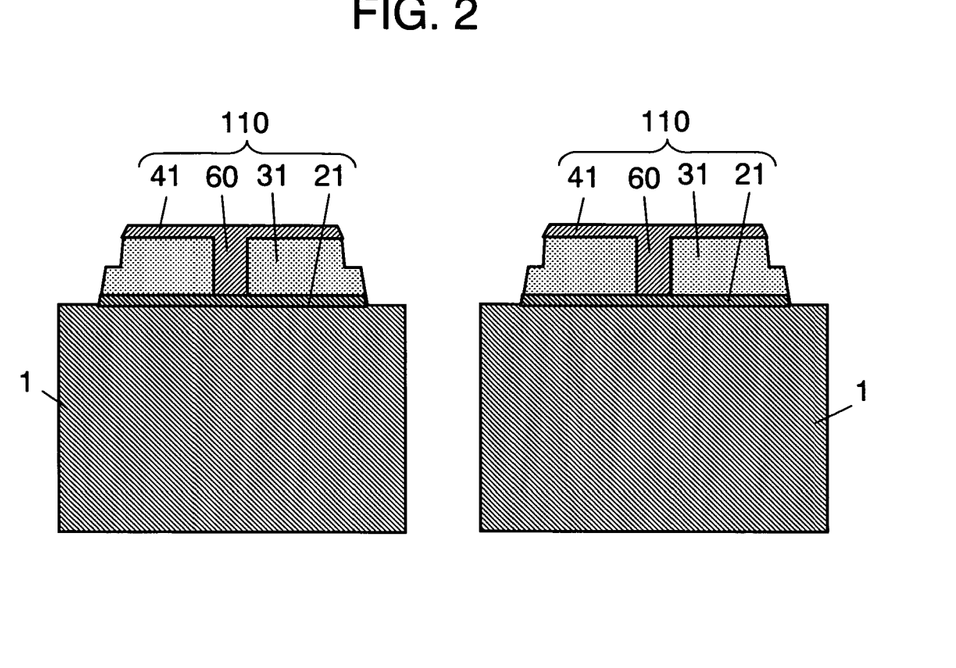
FIG. 2 is an enlarged sectional view of the angular velocity sensor in accordance with the exemplary embodiment of the present invention taken along line X1—X1 of FIG. 1.
Figure 3:
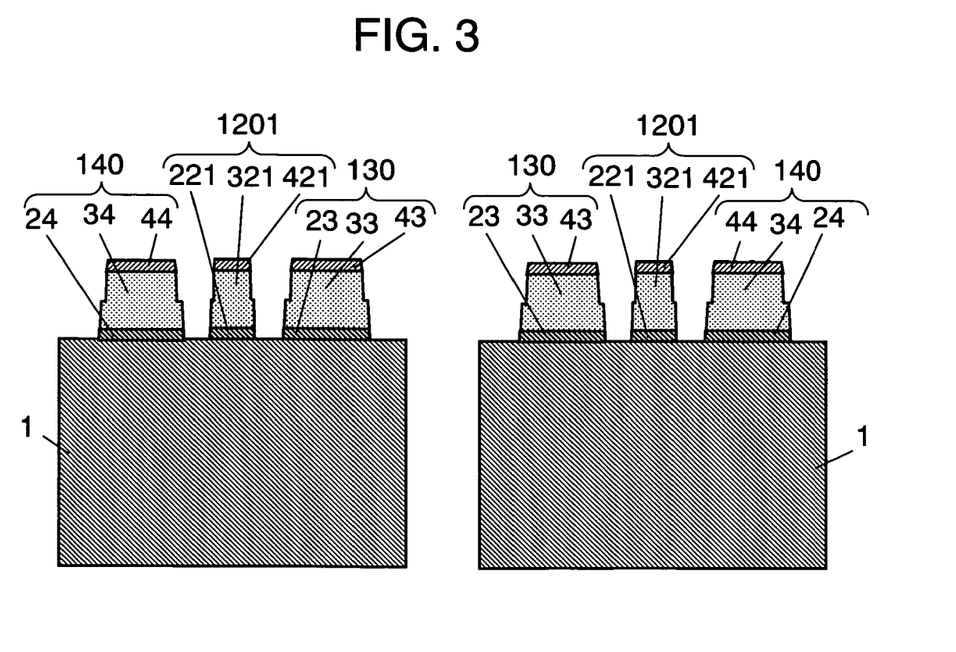
FIG. 3 is an enlarged sectional view of the angular velocity sensor in accordance with the exemplary embodiment of the present invention taken along line X2—X2 of FIG. 1.
Figure 4:
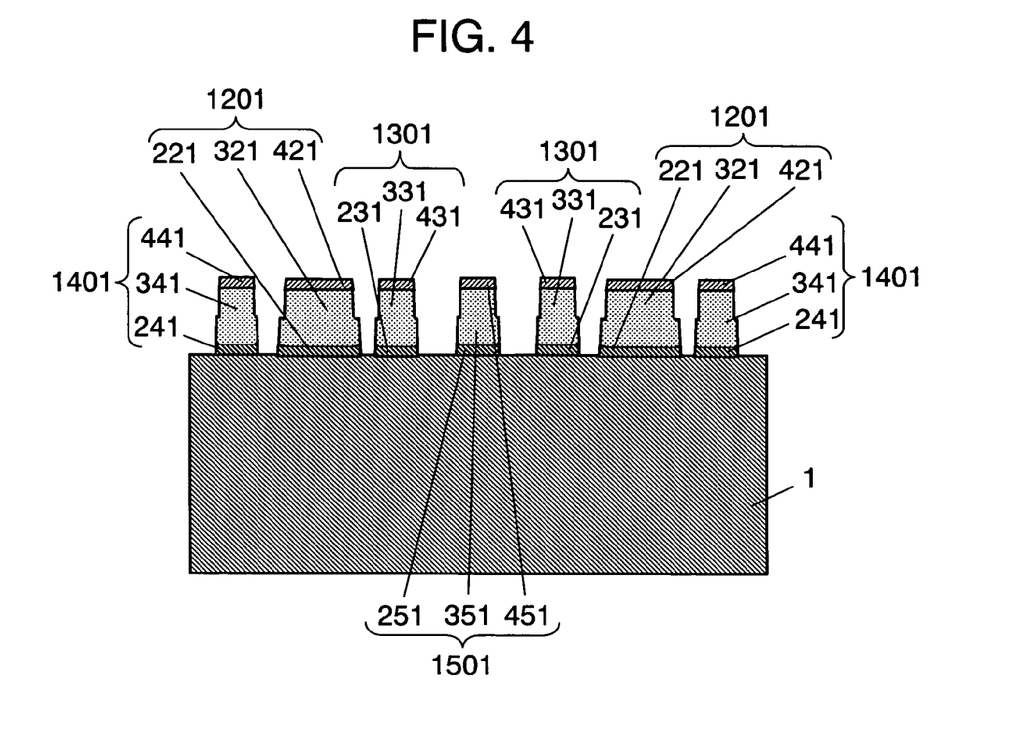
FIG. 4 is an enlarged sectional view of the angular velocity sensor in accordance with the exemplary embodiment of the present invention taken along line X3—X3 of FIG. 1.
Figure 5:
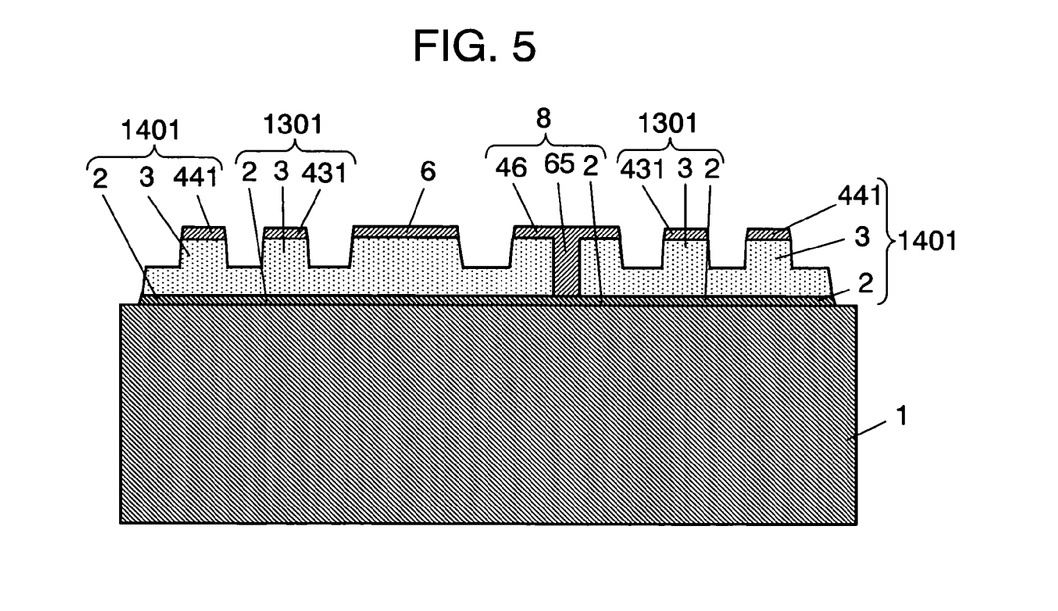
FIG. 5 is an enlarged sectional view of the angular velocity sensor in accordance with the exemplary embodiment of the present invention taken along line X4—X4 of FIG. 1.

A description is provided of an angular velocity sensor in accordance with an exemplary embodiment of the present invention hereinafter with reference to the accompanying drawings. FIG. 1 is a plan view of an angular velocity sensor of the present invention. FIGS. 2 through 5 are enlarged sectional views of the angular velocity sensor shown in FIG. 1. FIG. 2 is a sectional view of the angular velocity sensor taken along line X1—X1. FIG. 3 is a sectional view of the angular velocity sensor taken along line X2—X2. FIG. 4 is a sectional view of the angular velocity sensor taken along line X3—X3. FIG. 5 is a sectional view of the angular velocity sensor taken along line X4—X4. A detailed description is provided of the structure of the angular velocity sensor of the present invention hereinafter with reference to FIGS. 1 through 5.

A substrate 1 is made by machining a single-crystal silicon plate into a tuning-fork shape. A lower electrode layer, a piezoelectric thin film, and an upper electrode layer are laminated on this substrate 1. Then, these layers are processed to a predetermined shape to form an angular velocity sensor 100 of the present invention.

The lower electrode layer is made of a metallic thin film, e.g. a platinum (Pt) layer, platinum-titanium (Pt—Ti) alloy layer, gold (Au) layer, cupper (Cu) layer, nickel (Ni) layer, or aluminum (Al) layer, or an oxide conductor, e.g. ruthenium oxide ($RuO_2$) or iridium oxide ($IrO_2$). The methods of forming the layer include evaporation, sputtering, chemical vapor deposition (CVD), and plasma-enhanced chemical vapor deposition (PCVD).

As the piezoelectric thin film, lead zirconate titanate (PZT) is a desirable material because a thin film having excellent crystal orientation can easily be formed with it. However, the material is not limited to PZT. Any material capable of being formed into a piezoelectric thin film and etched, e.g. lead titanate (PT), lead zirconate (PZ), and lanthanum (La)-doped lead zirconate titanate (PLZT) can be used. As the method of forming the thin film, sputtering is desirable. However, evaporation, CVD, and PCVD can be used.

Further, for the upper electrode layer, the same materials as used for the lower electrode layer can be used. However, it is desirable to use metallic thin film because wire leads or the like are mounded on the upper electrode layer for electrical connection to an external device.

Angular velocity sensor 100 of the present invention is made of a plurality of areas each having its own function. In other words, on substrate 1 of a pair of arms forming a tuning fork, leads 110 for leading the lower electrode layer to the upper layer to polarize the entire piezoelectric thin film, detectors 120 for detecting angular velocity, drivers 135 for vibrating the pair of arms, and monitors 150 for detecting the amplitudes of vibrations generated in the pair of arms are formed from the vicinity of the tips in this order.

Further, formed on substrate 1 of an integral area integrally connecting the pair of arms are detector lead wirings 1201, inner driver lead wirings 1301, outer driver lead wirings 1401, monitor lead wiring 1501 led from leads 110, detectors 120, drivers 135 and monitors 150. These lead wirings 1201, 1301, 1401, and 1501 are connected to electrode pads 5, 6, 8, 71, and 72 for connection to an external device. Theses pads are detailed later.

FIG. 2 is a sectional view taken along line X1—X1 of FIG. 1, and shows a sectional shape of leads 110. As apparent from this drawing, lead lower electrode layer 21, i.e. a lower electrode layer, is connected to polarizing electrode layer 41, i.e. an upper electrode layer, via via-hole 60 formed through lead piezoelectric thin film 31. As apparent from respective sectional views of FIGS. 2 through 5, lead lower electrode layer 21 is electrically connected to the lower electrode layer in respective parts.

Detectors 120 for detecting angular velocity as shown in FIG. 1 are formed on the surface of arms of substrate 1 in substantially the same width as leads 110 in the same lamination structure. In other words, each detector 120 is structured so that a detector lower electrode layer (not shown), detector piezoelectric thin film (not shown), and detector upper electrode layer are laminated from the side of substrate 1 in this order with substantially the same width.

FIG. 3 is a sectional view taken along line X2—X2 of FIG. 1, and shows a sectional shape of the area in which drivers 135 are formed. On the surface of each arm of substrate 1, inner driver 130 and outer driver 140 are provided in pairs to form driver 135. The inner driver 130 and the outer driver 140 have the same shape. On each arm of substrate 1, driver lower electrode layers 23 and 24, driver piezoelectric thin films 33 and 34, and driver upper electrode layers 43 and 44 are formed in this order. Driver lower electrode layers 23 and 24, driver piezoelectric thin films 33 and 34, and driver upper electrode layers 43 and 44 are formed with substantially the same width. Additionally, detector lead wiring 1201 is formed between inner driver 130 and outer driver 140.

As shown in FIG. 1, monitor 150 is provided on the surface of each arm of substrate 1. Monitors 150 are structured so that monitor lower electrode layers (not shown), monitor piezoelectric thin films (not shown), and monitor upper electrode layers are formed in this order.

FIG. 4 is a drawing for illustrating the sectional shape of a wiring part taken along line X3—X3 of FIG. 1. On the wiring part of substrate 1, detector lead wirings 1201, inner driver lead wirings 1301, outer driver lead wirings 1401, and monitor lead wiring 1501 are formed. These lead wirings 1201, 1301, 1401, and 1501 are structured so that lower electrode layer lead wirings 221, 231, 241, and 251, piezoelectric thin film lead wirings 321, 331, 341, and 351, and upper electrode layer lead wirings 421, 431, 441, and 451, respectively, are formed from the side of substrate 1 in this order. Monitors 150 are integrated onto the surface of the wiring part of substrate 1 and wired as monitor lead wiring 1501.

Upper electrode layer lead wirings 421 in respective detectors lead wirings 1201 are connected to detector electrode pads 5. Upper electrode lead wirings 431 in respective inner driver lead wirings 1301 are connected to driver electrode pad 72. Similarly, upper electrode lead wirings 441 in respective outer driver lead wirings 1401 are connected to driver electrode pad 71. Upper electrode lead wiring 451 in monitor lead wiring 1501 is connected to monitor electrode pad 6.

Further, lower electrode lead wirings 221, 231, 241, and 251 in detector lead wirings 1201, inner driver lead wirings 1301, outer driver lead wirings 1401, and monitor lead wiring 1501, respectively, are collectively connected to ground electrode pad 8. This ground electrode pad 8 is structured as shown in FIG. 5. In other words, in the pad-forming part in which electrode pads are formed in the integral area, lower electrode layer lead wirings 221, 231, 241, and 251 are not etched and are formed on the entire surface of substrate 1. At the same time, the piezoelectric thin film is etched thin; however, it remains on the entire surface. The lower electrode layer lead wirings in this area are collected and called integral area lower electrode layer 200. The piezoelectric thin films are collected and called integral area piezoelectric thin film 300. This integral area lower electrode layer 200 is connected to lead electrode layer 46 via via-hole 65 open through integral area piezoelectric thin film 300. These elements form ground electrode pad 8.

In the part in which these electrode pads are formed, integral area lower electrode layer 200 is formed on the entire surface, and moreover integral area piezoelectric thin film 300 is only etched halfway in the direction of thickness and a part thereof remains on the entire surface to protect integral area lower electrode layer 200. This prevents short circuits between detector electrode pads 5, driver electrode pads 71 and 72, and monitor electrode pad 6, and integral area lower electrode layer 200.

In detectors 120, drivers 135, and monitors 150, voltages are applied across detector lead wirings 1201, inner driver lead wirings 1301, outer driver lead wirings 1401 and monitor lead wiring 1501, and ground electrode pad 8. For example, in detectors 120, voltages from external circuits (not shown) are applied across detector electrode pads 5 and ground electrode pad 8. Detector electrode pads 5 are connected to upper electrode lead wirings 421 in detector lead wirings 1201. Further, these upper electrode lead wirings 421 are connected to detector upper electrode layers. On the other hand, ground electrode pad 8 is connected to lower electrode layer lead wirings 221 in detector lead wirings 1201. Further, these lower electrode layer lead wirings 221 are connected to the detector lower electrode layers (not shown).

Between each upper electrode layer lead wiring 421 and corresponding lower electrode layer lead wiring 221, piezoelectric thin film lead wiring 321 is formed to prevent short circuits between the wirings. Similarly, between each detector upper electrode layer (not shown) and the corresponding detector lower electrode layer (not shown), a detector piezoelectric thin film (not shown) is formed to prevent short circuits between the wirings.

Figure 6A:
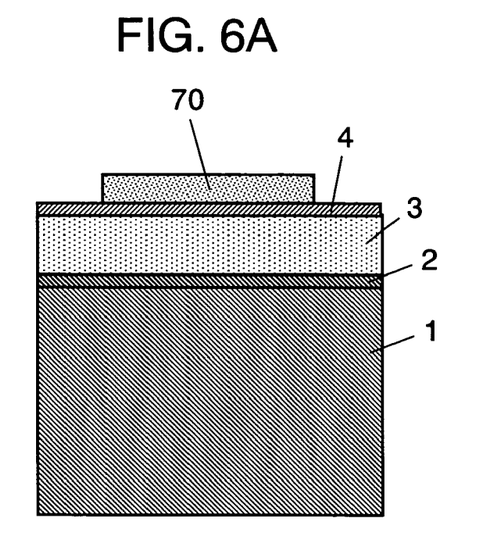
FIG. 6A is a drawing for illustrating an example of photolithography and etching processes of an angular velocity sensor in accordance with the exemplary embodiment of the present invention. The drawing is a sectional view showing that a lower electrode layer, a piezoelectric thin film, and an upper electrode layer are laminated on a substrate and a resist pattern is formed.
Figure 6B:
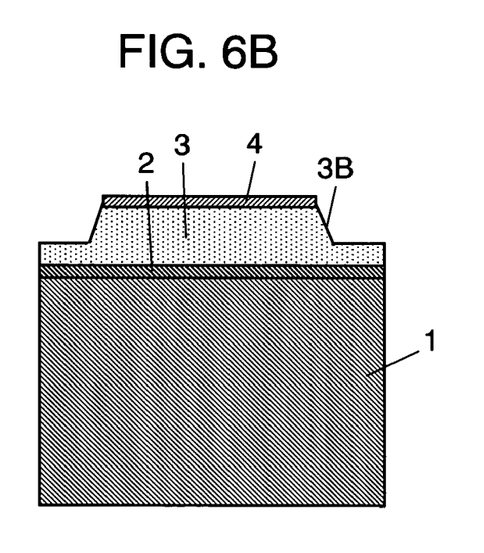
FIG. 6B is a drawing for illustrating the processes. The drawing is a sectional view showing the piezoelectric thin film etched halfway.
Figure 6C:
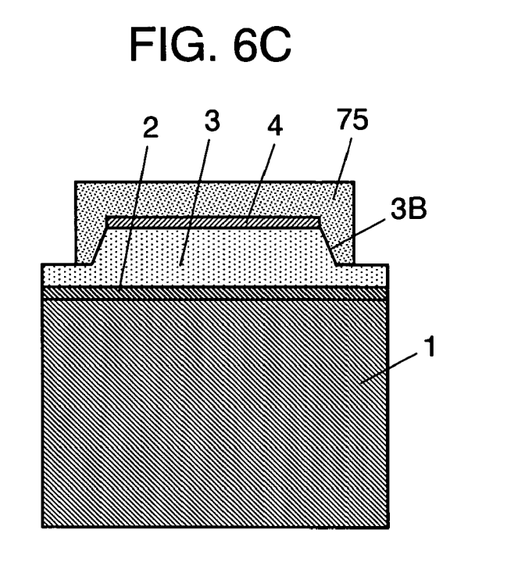
FIG. 6C is a drawing for illustrating the processes. The drawing is a sectional view showing a resist pattern produced so that a flat portion is formed.
Figure 6D:
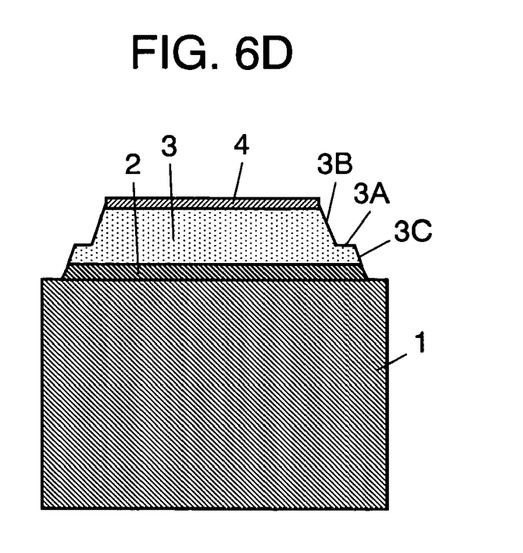
FIG. 6D is a drawing for illustrating the processes. The drawing is a sectional view showing an outer peripheral edge of the piezoelectric thin film etched into a step to form a flat portion.

In this embodiment, to prevent these short circuits, a piezoelectric thin film 3 is formed into a shape as shown in FIG. 6D. An example of a method of producing such a shape is described with reference to FIGS. 6A through 6D. FIGS. 6A through 6D are enlarged sectional views of a given portion of angular velocity sensor 100 shown in FIG. 1. Thus, in the following description, components are referred to as a lower electrode layer 2, a piezoelectric thin film 3, and an upper electrode layer 4.

As shown in FIG. 6A, after lower electrode layer 2, piezoelectric thin film 3, and upper electrode layer 4 are laminated on substrate 1 in this order, a photo resist layer is applied thereon and exposed to light, to produce a resist pattern 70 of a predetermined shape. Thereafter, upper electrode layer 4 and piezoelectric thin film 3 are dry-etched at the same time. At this time, etching is completed when piezoelectric thin film 3 is etched halfway. This state is shown in FIG. 6B. If the thickness of the photo resist layer and the conditions for the dry etching are appropriately set at this time, taper portion 3B can be formed along the outer peripheral edge of piezoelectric thin film 3.

Thereafter, as shown in FIG. 6C, another photo resist layer is applied and exposed to light, to form resist pattern 75 of a predetermined shape. Then, remaining piezoelectric thin film 3 and lower electrode layer 2 are dry-etched. At this time, by setting the width of resist pattern 75 larger than the width of first resist pattern 70, a flat portion 3A can easily be formed. The width of this flat portion 3A can arbitrarily be set by designing first resist pattern 70 and second resist pattern 75.

FIG. 6D shows how such photolithography and etching processes form a step along the outer peripheral edge of piezoelectric thin film 3 and produce flat portion 3A along the thickness direction.

The above-described manufacturing method can form a step having flat portion 3A along the outer peripheral edge of piezoelectric thin film 3. Further, because there is no upper electrode layer 4 on the surface of flat portion 3A, short circuits between upper electrode layer 4 and lower electrode layer 2 can be prevented even with thin piezoelectric thin film 3.

This method of etching piezoelectric thin film 3 two times can easily form flat portion 3A. During etching of piezoelectric thin film 3, it often occurs that the photo resist layer is etched and disappears, and thus etching must be stopped. This method can also prevent such a problem. Such a sequence of forming steps can be performed more than two times to produce a plurality of flat portions.

In the pad-forming part in the integral area, only the first photolithography and etching processes are performed. The second etching process for piezoelectric thin film 3 and lower electrode layer 2 are not performed. As a result, as shown in FIG. 5, the lower electrode layer is collectively connected, and the piezoelectric thin film can be etched halfway and left in this part. In such a process, the dry etching ensures etching of the upper electrode layer. This can prevent short circuits between the upper electrode layers resulting from insufficient etching or other causes. Additionally, because the piezoelectric thin film remains on the entire surface, short circuits between the lower electrode layer and the upper electrode layer can be securely prevented. Further, such patterning can be performed on the entire part of the integral area.

The operation of an angular velocity sensor of this structure is described hereinafter. Positive and negative signals are alternately applied to driver electrode pads 71 and 72 from external circuits (not shown). Responsive to these signals, inner drivers 140 contract when outer drivers 130 extend. Thus, each arm of substrate 1 constituting a tuning fork laterally vibrates in the plan view of FIG. 1. The amplitudes of these lateral vibrations are detected by external circuits (not shown) via monitor electrode pad 6 connected to monitors 150. The external circuits compare the detected amplitudes with a reference value, and control the magnitudes of signals to be applied to drivers 130 and 140. This controls the amplitudes of lateral vibrations in each arm to a constant value.

When an angular velocity is applied in this controlled state, the effect of the known Coriolis force causes the right and left arms constituting a tuning fork to vibrate back and forth in reverse directions in the plan view of FIG. 1. Detectors 120 detect the amplitudes of the back and forth vibrations of each arm. The external circuits (not shown) detect signals from detectors 120 via detector electrode pads 5, and output an angular velocity value based on the magnitudes of the signals.

Leads 110 are used to polarize the piezoelectric thin film and do not have special functions as an angular velocity sensor.

Angular velocity sensor 100 of the present invention has a large area of regions in which the upper electrode layer and lower electrode layer sandwich the piezoelectric thin film. In these regions, the outer peripheral edge of the piezoelectric thin film is shaped like a step and has flat portion 3A along the thickness direction. In use of an angular velocity sensor, voltages are applied across the upper electrode layer and lower electrode layer. However, the outer peripheral edge of the piezoelectric thin film is shaped like a step and has flat portion 3A along the thickness direction. This structure ensures prevention of short circuits between the upper electrode layer and lower electrode layer. For this reason, highly reliable angular velocity sensors 100 having high yields and stable characteristics can be realized. As a result, the angular velocity sensor is especially useful in the field in which reliability and downsizing are required, such as applications in vehicles.

For angular velocity sensor 100 of this embodiment, single-crystal silicon substrate is used as substrate 1. A single-crystal silicon substrate is easy to machine flat, and has a smooth surface. It is easy to form a lower electrode layer, piezoelectric thin film, and upper electrode layer thereon and pattern these layers. For these reasons, a single-crystal silicon substrate is preferable. However, the present invention is not necessarily limited to this material. Other substrates include single-crystal substrates (e.g. quartz crystal substrate and magnesium oxide single-crystal substrate), amorphous substrates (e.g. a glass substrate and quartz substrate), and ceramic substrates (e.g. an alumina substrate and zirconium substrate). When a glass substrate or the like is used, sand-blasting, for example, can be used as a method of producing a tuning-fork shape.

Figure 7:
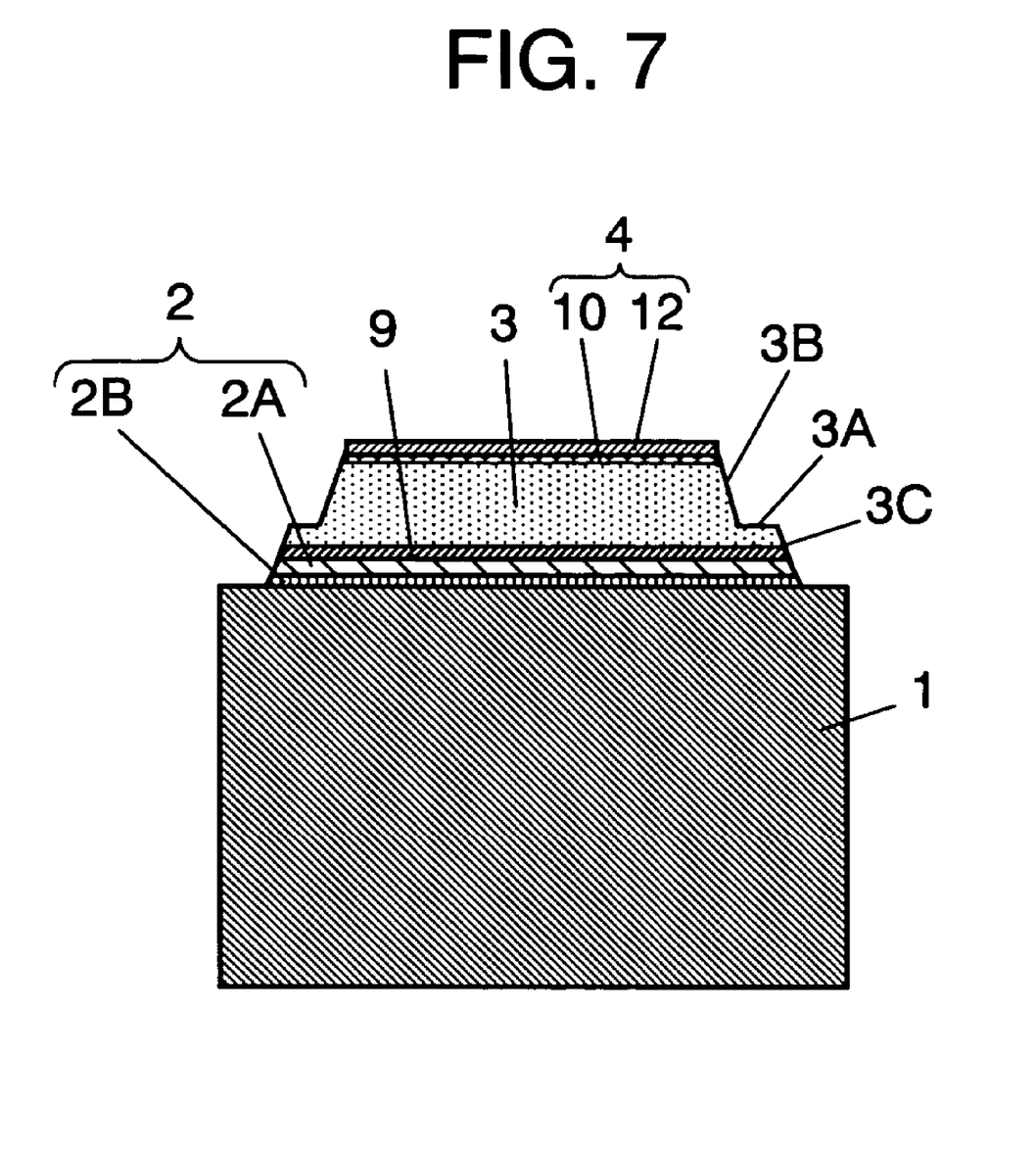
FIG. 7 is a sectional view for illustrating a modification of an angular velocity sensor in accordance with the exemplary embodiment of the present invention.

In the angular velocity sensor of the present invention, as shown in FIG. 7, lower electrode layer 2 can have a two-layer structure made of a titanium (Ti) layer 2A in contact with the substrate and a platinum-titanium (Pt—Ti) layer 2B formed on this Ti layer 2A. Because Ti layer 2A has excellent adherence to substrate 1, e.g. a silicon substrate and glass substrate, the adherence of lower electrode layer 2 to substrate 1 can greatly be improved. Further, because titanium (Ti) is unlikely to diffuse in Pt—Ti layer 2B and piezoelectric thin film 3, deterioration of piezoelectric thin film 3 is unlikely to occur. Thus, the reliability of the sensor can be improved.

As shown in FIG. 7, upper electrode layer 4 can have a two-layer structure made of a Ti layer 10 and a low-resistance conductor layer 12 formed on this Ti layer 10. Because this structure can improve the adherence of upper electrode layer 4 and prevent diffusion thereof, upper electrode layer 4 can be selected more freely and the structure of electrodes of electrode pads for connection to external circuits can be designed more easily. The materials of low-resistance conductor layer 12 can include the above-mentioned Pt—Ti, gold (Au), copper (Cu), nickel (Ni), and aluminum (Al).

As for piezoelectric thin film 3, the thickness on the upper side of flat portion 3A can be made thicker than the thickness on the lower side with respect to flat portion 3A. Such a shape can be formed by the above-described photolithography and dry etching processes. During such processes, taper portions 3B and 3C can be provided in piezoelectric thin film 3. It is preferable that these taper portions 3B and 3C are at angles smaller than 90° with respect to the surface of substrate 1. Such taper shapes can be made by setting the thickness and sectional shape of the photo resist layer, and dry-etching conditions. Providing taper portions 3B and 3C can increase the distance from upper electrode layer 4 to lower electrode layer 2, thus further ensuring prevention of short circuits.

Additionally, as shown in FIG. 7, a magnesium-doped lead lanthanum titanate (PLMT) layer 9 can be formed between lower electrode layer 2 and piezoelectric thin film 3. When PZT film is formed on such a layer, the crystallinity and orientation of the PZT film improve and thus the piezoelectric characteristics can improve.

As apparent from FIG. 1, in angular velocity sensor 100 of the present invention, leads 110, detectors 120, drivers 135, and monitor 150, and lead wirings 1201, 1301, 1401, 1501 and the like therefrom are disposed inside of the outer peripheral edge of substrate 1 so that predetermined spaces are provided therebetween. For example, the arms located above leads 110, the wiring part in the integral area, and the spaces between detectors and drivers and the outer periphery of the substrate are holding areas. Because of this configuration, when the bottom face of substrate 1 is processed, these spaces are used for holding the substrate. Therefore, the upper electrode layer, piezoelectric thin film, and lower electrode layer are not damaged.

In this embodiment, the piezoelectric thin film in the pad-forming part remains with a part thereof etched in the thickness direction. However, the present invention is not limited to this form. For instance, if the etching conditions where the etching selection ratio of the upper electrode layer and piezoelectric thin film is extremely large are selected, the piezoelectric thin film can be left on the entire surface. Such a structure can also be employed.

INDUSTRIAL APPLICABILITY

The present invention aims to prevent short circuits between a lower electrode layer and an upper electrode layer, which are a serious problem in realizing an angular velocity sensor using a piezoelectric thin film. Drivers, monitors, and detectors formed on a substrate are made of a lower electrode layer, a piezoelectric thin film formed on the lower electrode layer, and an upper electrode layer formed on the piezoelectric thin film. The outer peripheral edge of the piezoelectric thin film is shaped like a step having at least one flat portion. Additionally, the flat portion along the outer peripheral edge has no upper electrode layer. This structure ensures prevention of short circuits between the upper electrode layer and lower electrode layer. For this reason, the present invention is useful in the field of angular velocity sensors for vehicles or the like.

REFERENCE MARKS IN THE DRAWINGS 1 substrate
2 lower electrode layer
2A, 10 titanium (ti) layer
2B platinum-titanium (Pt—Ti) layer
3 piezoelectric thin film
3A, 3B taper portion
4 upper electrode layer
5 detector electrode pad
6 monitor electrode pad
8 ground electrode pad
9 magnesium-doped lead lanthanum titanate (PLMT)
12 low-resistance layer
21 lead lower electrode layer
23, 24 driver lower electrode layer
31 lead piezoelectric thin film
33, 34 driver piezoelectric thin film
41 polarizing electrode layer
43, 44 driver upper electrode layer
46 lead electrode layer
60, 65 via hole
70, 75 resist pattern
71, 72 driver electrode pad
100 angular velocity sensor
110 lead
120 detector
130 inner driver
135 driver
140 outer driver
150 monitor
200 integral area lower electrode layer
221, 231, 241, 251 lower electrode layer lead wiring
300 integral area piezoelectric thin film
321, 331, 341, 351 piezoelectric thin film lead wiring
421, 431, 441, 451 upper electrode layer lead wiring
1201 detector lead wiring
1301 inner driver lead wiring
1401 outer driver lead wiring
1501 monitor lead wiring

The invention claimed is:

1. An angular velocity sensor comprising:
a substrate including an integral area and a pair of spaced apart arms extending from said integral area such that said substrate is tuning-fork-shaped;
a lower electrode layer formed on said substrate;
a piezoelectric thin film formed on said lower electrode layer;
an upper electrode layer formed on said piezoelectric thin film;
wherein said lower electrode layer, said piezoelectric thin film and said upper electrode layer are arranged so as to form
a driver on each of said arms of said substrate for vibrating said arms,
a monitor on each of said arms of said substrate for detecting vibration of said arms generated by said drivers, and
a detector on each of said arms of said substrate for detecting displacement of vibration made in application of an angular velocity;
wherein said piezoelectric thin film has an outer peripheral edge that is step-shaped so as to have at least one flat portion; and
wherein said at least one flat portion of said step-shaped outer peripheral edge has no upper electrode layer formed thereon.

2. The angular velocity sensor of claim 1, wherein
said lower electrode layer, said piezoelectric thin film and said upper electrode layer are further arranged so as to form
a wiring part provided on said integral area of said substrate and including lead wiring extending from said driver, said monitor, and said detector, and
a pad-forming part provided on said integral area of said substrate and including a first electrode pad connected to said lead wiring; and
an entirety of the portion of said lower electrode forming said pad-forming part is connected to said first electrode pad.

3. The angular velocity sensor of claim 2, wherein
a thickness of said piezoelectric thin film between said lead wiring in said pad-forming part is thinner than a thickness of said piezoelectric thin film in said driver, said monitor and said detector.

4. The angular velocity sensor of claim 2, wherein said substrate is made of single-crystal silicon.

5. The angular velocity sensor of claim 2, wherein a portion of said piezoelectric thin film above said at least one flat portion has a greater thickness than a portion of said piezoelectric thin film below said at least one flat portion.

6. The angular velocity sensor of claim 2, wherein said lower electrode layer has a two-layer structure including a titanium layer formed on said substrate and a platinum-titanium alloy layer formed on said titanium layer.

7. The angular velocity sensor of claim 2, wherein said drivers, said monitors and said detectors are formed on a first surface of said substrate, and said first surface of said substrate includes, at an outer peripheral portion thereof, a holding area for holding said substrate to process a second surface thereof.

8. The angular velocity sensor of claim 1, wherein said substrate is made of single-crystal silicon.

9. The angular velocity sensor of claim 8, wherein a portion of said piezoelectric thin film above said at least one flat portion has a greater thickness than a portion of said piezoelectric thin film below said at least one flat portion.

10. The angular velocity sensor of claim 8, wherein said lower electrode layer has a two-layer structure including a titanium layer formed on said substrate and a platinum-titanium alloy layer formed on said titanium layer.

11. The angular velocity sensor of claim 8, wherein said drivers, said monitors and said detectors are formed on a first surface of said substrate, and said first surface of said substrate includes, at an outer peripheral portion thereof, a holding area for holding said substrate to process a second surface thereof.

12. The angular velocity sensor of claim 1, wherein a portion of said piezoelectric thin film above said at least one flat portion has a greater thickness than a portion of said piezoelectric thin film below said at least one flat portion.

13. The angular velocity sensor of claim 12, wherein said lower electrode layer has a two-layer structure including a titanium layer formed on said substrate and a platinum-titanium alloy layer formed on said titanium layer.

14. The angular velocity sensor of claim 12, wherein said drivers, said monitors and said detectors are formed on a first surface of said substrate, and said first surface of said substrate includes, at an outer peripheral portion thereof, a holding area for holding said substrate to process a second surface thereof.

15. The angular velocity sensor of claim 1, wherein said lower electrode layer has a two-layer structure including a titanium layer formed on said substrate and a platinum-titanium alloy layer formed on said titanium layer.

16. The angular velocity sensor of claim 1, wherein said drivers, said monitors and said detectors are formed on a first surface of said substrate, and said first surface of said substrate includes, at an outer peripheral portion thereof, a holding area for holding said substrate to process a second surface thereof.

17. The angular velocity sensor of claim 1, wherein said drivers, said monitors and said detectors are formed on a first surface of said substrate, and said first surface of said substrate faces in a first direction; and
said at least one flat portion of said piezoelectric thin film faces in said first direction.

18. The angular velocity sensor of claim 1, wherein at each of said drivers, said monitors and said detectors, said piezoelectric thin film is formed between said upper electrode layer and said lower electrode layer.

19. The angular velocity sensor of claim 1, wherein said lower electrode layer, said piezoelectric thin film and said upper electrode layer are further arranged so as to form
a wiring part provided on said integral area of said substrate and including driver lead wiring extending from said drivers, monitor lead wiring extending from said monitors, and detector lead wiring extending from said detectors, and
a pad-forming part provided on said integral area of said substrate and including a driver electrode pad connected to said driver lead wiring, a monitor electrode pad connected to said monitor lead wiring, a detector electrode pad extending from said detector lead wiring, and a ground electrode pad connected to said driver electrode wiring and said monitor electrode wiring.

* * * * *